(No Model.) 3 Sheets—Sheet 1.

W. WESTLAKE.
CAR LAMP.

No. 354,455. Patented Dec. 14, 1886.

Witnesses:
A. S. Fitch
Henry Eubling

Inventor
William Westlake
By A. P. Fitch
atty (No Model.) 3 Sheets—Sheet 2.

W. WESTLAKE.
CAR LAMP.

No. 354,455. Patented Dec. 14, 1886.

Witnesses:
A. S. Fitch.
Henry Eichling

Inventor:
William Westlake
By J. P. Fitch
atty (No Model.) 3 Sheets—Sheet 3.

W. WESTLAKE.
CAR LAMP.

No. 354,455. Patented Dec. 14, 1886.

Witnesses:
Henry Geitling
A. S. Fitch

Inventor
William Westlake
By J. S. Fitch
Atty.

UNITED STATES PATENT OFFICE.

WILLIAM WESTLAKE, OF BROOKLYN, NEW YORK.

CAR-LAMP.

SPECIFICATION forming part of Letters Patent No. 354,455, dated December 14, 1886.

Application filed February 17, 1886. Serial No. 192,190. (No model.)

*To all whom it may concern:*

Be it known that I, WILLIAM WESTLAKE, of Brooklyn, county of Kings, State of New York, and a citizen of the United States, have invented an Improved Car-Lamp, of which the following is a full, clear, and exact description, reference being had to the accompanying drawings, forming part of this specification.

My invention relates to lamps which from the nature of their position and use are subjected to sudden and violent variations in the direction and velocity of the surrounding air-currents—such, for example, as railway-car lamps; and my invention consists in the devices and their combinations, hereinafter particularly described, whereby the air to be supplied to the lamp-burner is drawn into a chamber and therein heated and expanded, and passes thence to a chamber where it is cooled and contracted, and thence to the burner, and by this continuous operation is fed to the burner under a force or pressure which is substantially uniform and continuous during the burning of the lamp, so that the flame of the lamp is intensified and its illuminating-power increased, and it is at the same time steadied and enabled to withstand the influence of external air-currents exerted upon the lamp-chimney, all as hereinafter set forth and described.

Figure 1:
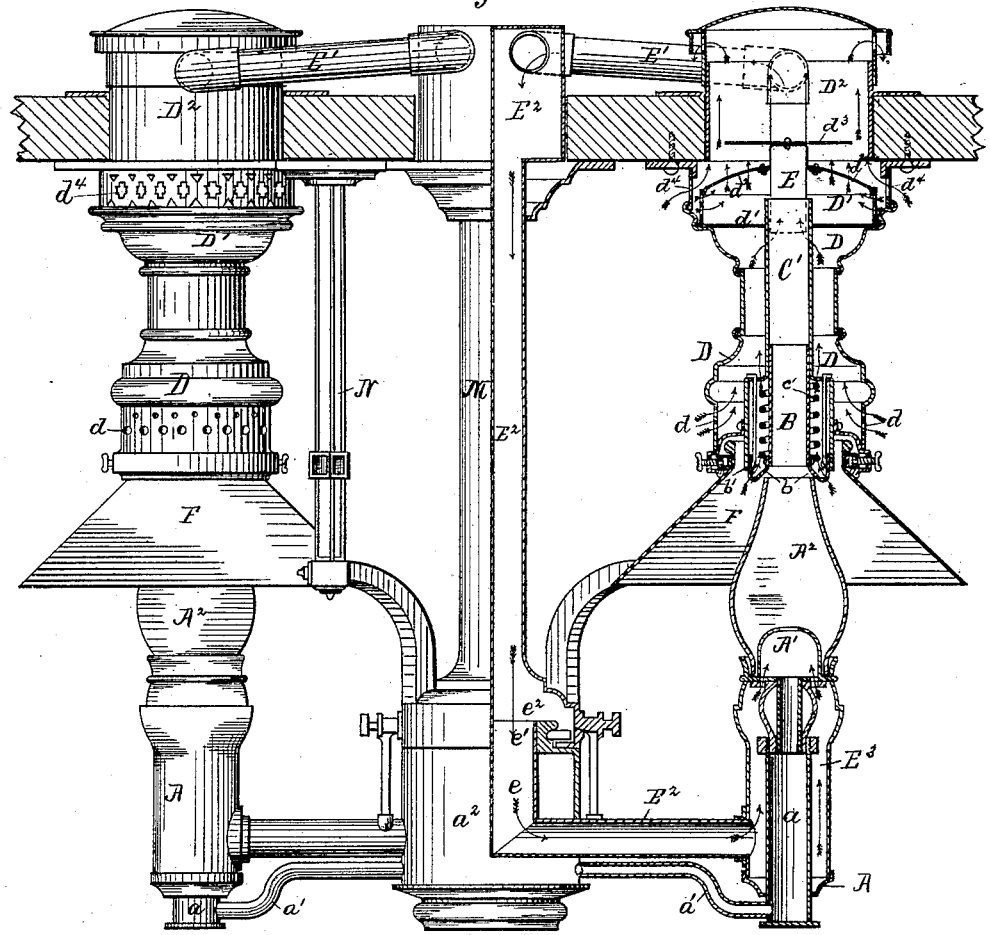
Figure 2:
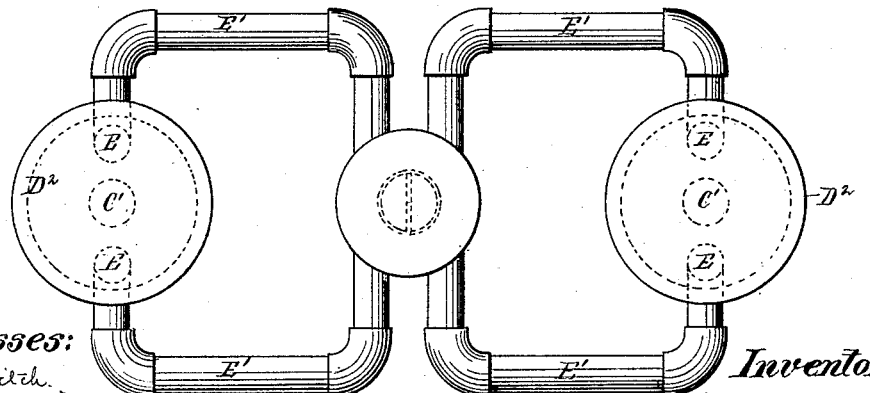
Figure 3:
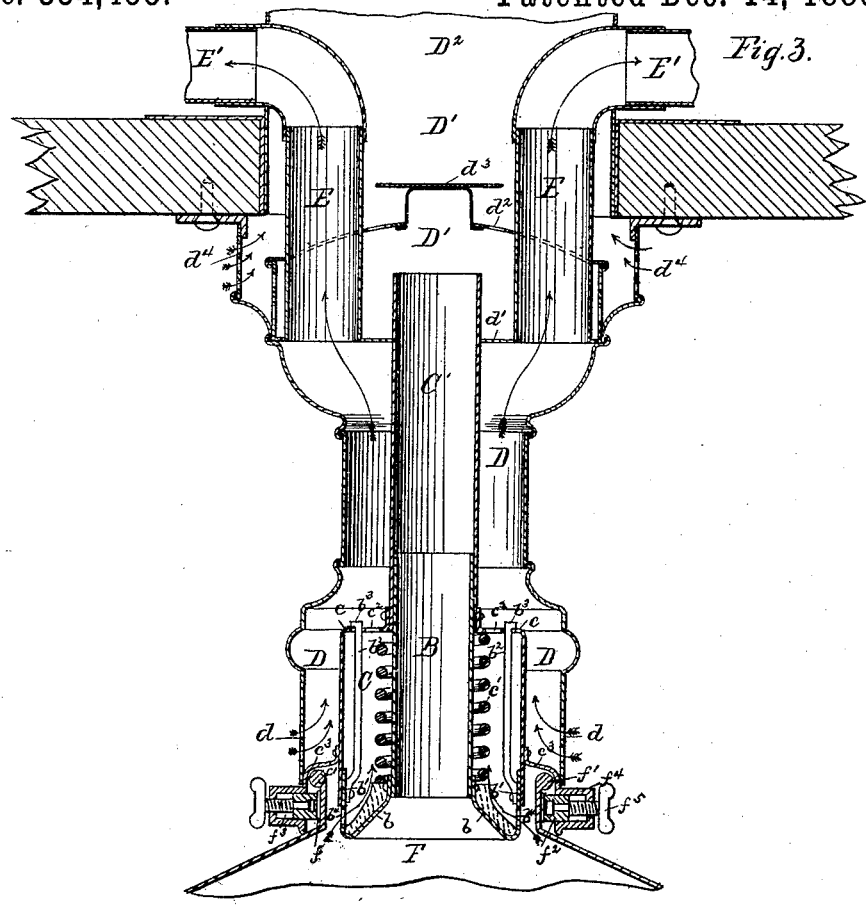
Figure 4:
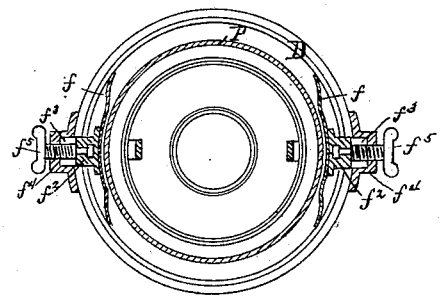
Figure 5:
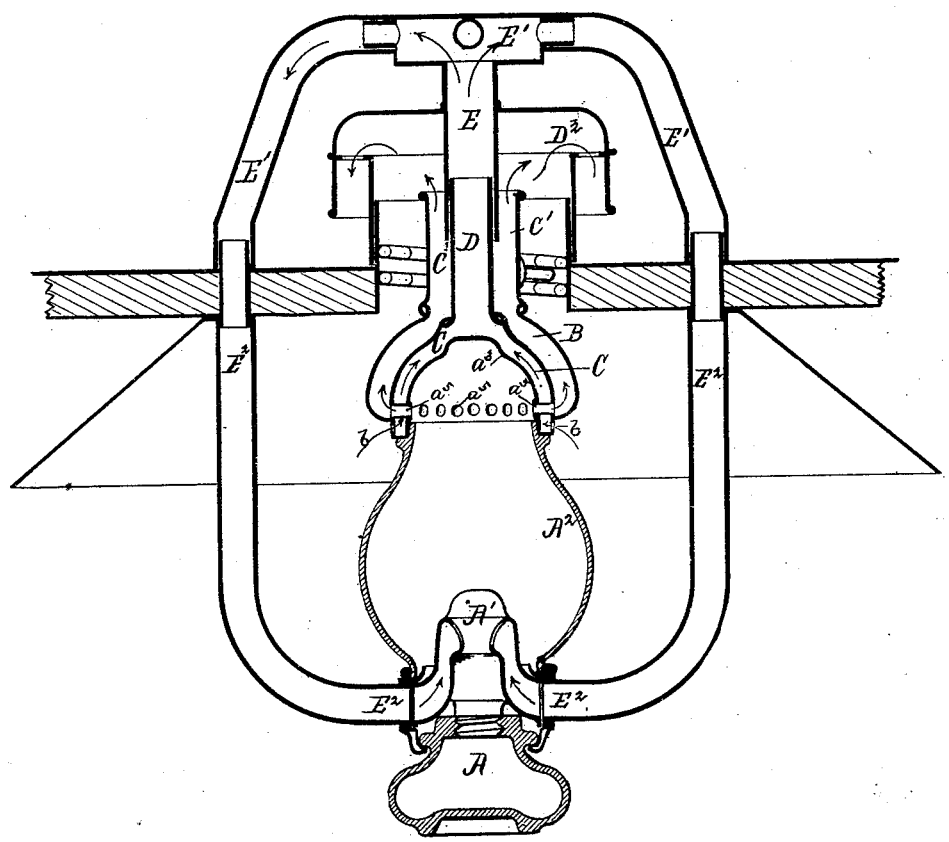
Figure 6:
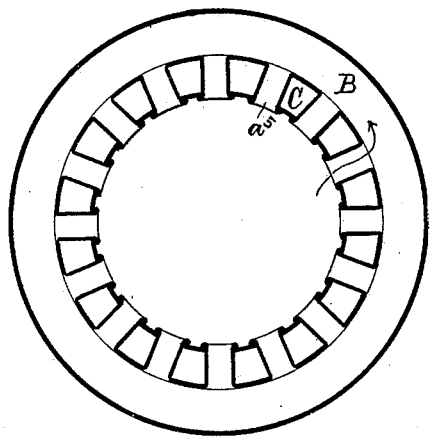
Figure 7:
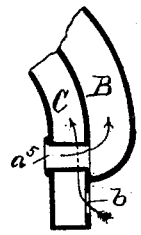

Figure 1 is a side view of a pair of lamps suspended rigidly from the car-roof and containing my invention, one of the lamps being shown in elevation and the other in vertical central section. Fig. 2 is a plan of my air-cooling chambers. Fig. 3 is an enlarged view, in vertical central section, on a plane at right angles to the plane of the similar section in Fig. 1, of a car-lamp containing my invention. Fig. 4 is a plan, partly in section, of the shade-sustaining devices which I employ in my lamp. Fig. 5 is a vertical central section of a single car-lamp containing my invention in a modified form. Fig. 6 is an enlarged horizontal section of same on line $x\ x$, Fig. 5; and Fig. 7 is a vertical section in detail, enlarged, of a portion of the lamp shown in Fig. 5.

In Figs. 1, 2, and 3 my invention is shown as applied to a double-bracket car-lamp, which is suspended rigidly from the car-roof. As therein shown, A A are the lamps, each having an individual oil-reservoir, $a$, which is fed through a pipe, $a'$, from an oil-pot, $a^2$, which is common to both lamps. A' is the burner, and $A^2$ the glass chimney in the usual form. Immediately above the chimney, and in line with it and of substantially the same diameter as the chimney-mouth, is the chimney B, composed, preferably, of thin sheet metal. This chimney B has at its lower end the flaring annular flange $b$, having the annular upwardly-turned rim $b'$. The top of the chimney $A^2$ has bearing or contact with the flange $b$. Exteriorly of the chimney B, and surrounding it, is the chamber C, the lower rim or part of which fits upon the upwardly-turned rim $b'$. At its upper end the chamber C opens into the chimney C', which fits upon the upper end of the chimney B. It is desirable to attach guide-rods $b^2$ to the flange $b$, such rods extending upwardly of the chamber C and through suitable slots in the wall $c$ at the top of the chamber, exteriorly of which they have the projections or stops $b^3$, which operate to limit the downward movement of the rods in said slots.

A spring, $c'$, serves to hold the chimney B down in contact with the top of the chimney $A^2$, and by means of the described construction the chimney B may be slid upwardly of the chamber C and chimney C', as is necessary to enable the chimney $A^2$ to be raised or removed from the burner when lighting the lamp or cleaning the several parts. The chamber C has perforations $b^4$ in its wall at its lower part, and perforations $c^2$ in its wall at its upper part, so that air may enter at the bottom and circulate through the chamber and pass out at the top.

Exteriorly of the chamber C, and surrounding the same and its chimney C', is the chamber D. Upon the lower edge of this chamber are arranged the shade-holding devices, hereinafter described, and the chamber is united to the chamber C by means of the braces $c^3$, and the parts thus rigidly connected are fixedly suspended from the car-roof by a flange on the top of the cylinder, constituting the chamber D, bolted to the car-roof. The chamber D may be perforated at $d$, at its lower part, to admit air for passage through the chamber, as hereinafter described. This chamber is closed at its upper end by the diaphragm $d'$, below the line of the top of the chimney C', said chimney, thus extending through said diaphragm into the inclosed space above the diaphragm, constituting a chamber, D'. Within this chamber D', above the top of the chimney C', is the perforated diaphragm $d^2$ and wind-guard $d^3$, constituting devices for protecting the chimney-top from the entrance thereto of air-currents or wind-gusts. Above these wind-guards the chamber D' opens into a ventilator or flue, $D^2$, that leads through the roof to the exterior of the car. In the wall of the chamber D' may be made the car-ventilating perforations $d^4$.

At E are shown a pipe or pipes leading upwardly from the chamber D, through the diaphragm $d'$ to the exterior of the car-roof, and there opening into the chambers or flues E', which are located outside the car, as shown. From these chambers E' a pipe or flue, $E^2$, extends downwardly through the car-roof, as shown, being preferably located in or made part of the central bracket or support of the lamps, as shown. This flue $E^2$ reaches to below the level of the lamp-burner, being preferably continued as a tube, $e$, through the oil-pot $a^2$, and thence to a chamber, $E^3$, formed, preferably, around the lamp-reservoir $a$, and which has vent only at and around the lamp-burner, as shown.

It is obvious that when the lamp is lighted the products of combustion will pass upwardly of chimneys $A^2$, B, and C' and through the chamber D', and thence escape through the ventilator $D^2$, and that in their traverse of the chimney B they will heat the same, and the radiation thereof will heat the chamber C. By this means air will be drawn into and through the chamber C and be therein heated and expanded, and will pass thence into the chamber D; and it is evident that the radiation of the chimney C' will assist and augment the heating and expansion of the air in the chamber D, and that a current of external air may be drawn in through the perforations $d$, and this air be heated therein, and an air-circulation through the chamber and upward into the pipe or pipes E be established and maintained. The expansion of this supplied air will operate to force or drive the air in the chamber E' and flue $E^2$ to the burner and upon the flame with more or less pressure, and it is evident that the air heated by the chambers C and D, one or both, will in its passage through the chamber E' be cooled and condensed, owing to the influence of the cool air external of the car, and will in turn be forced or driven, and, being cool, will have a tendency to fall through the flue $E^2$ to the burner, and that by this operation of first heating and expanding and then cooling and condensing the air to be supplied to the burner the air will be fed to the burner at the vent of the chamber $E^3$ under a force or pressure which will be substantially constant and uniform. By means of this current of air the illuminating-power of the flame will be augmented, owing to the increase in the oxygen supplied to the flame by the air-pressure, and, furthermore, the flame will be stiffened and steadied and enabled to withstand the influence of variations or disturbances in external air-currents which may enter or play upon the lamp-chimney. It is further evident that the chimney $A^2$, being in close contact with the lower rim of the chimney B, and the burner being open for an air-supply only from the chamber $E^3$, the influence of air-currents external of the lamp, even within the car about the burner, will not be felt by the flame.

In constructing my lamp, as aforesaid, the shade F is sustained by leaf-springs $f$, which engage the top rim of the shade below the beading $f'$, and which are clamped to the shade, so as to rigidly hold the same, by the blocks $f^2$, working in bearing-recesses $f^3$, formed in projections $f^4$ on the lower edge or end of the cylinder forming the chamber D, as shown. Said blocks have the operating thumb-screws $f^5$, swivel-jointed thereto, as shown. By the described means the shades are detachably held in rigid suspension to the car-roof. It is also obvious that by means of the described construction of parts the metal chimneys and the heating-chambers, together with the lamp-shades, are rigidly suspended from the car-roof, as is the central bracket, M, carrying the flues $E^2$, which bracket may have the auxiliary braces N, as shown, and that the common lamp-pot and its branch pipes and connections carrying the lamp-reservoirs, and the lamps themselves, may be detachably connected to the central support, M, so as to be removable without disturbing the described fixed parts. To this end the tube $e$, extending through the lamp-pot $a^2$, continues above the top thereof, and its end $e'$ is adapted to enter the wide mouth $e^2$ of the flue $E^2$, as shown. Therefore when the double lamp is attached to the central support the flue $E^2$ becomes a continuous pipe.

In the modified form of my invention shown in the single center lamp for cars indicated in Fig. 5 the air to be supplied to the flame enters at $b$ and passes into a heating-chamber, C, which is interiorly located of and inclosed by a metal chamber, B, the inner wall of said chamber being constituted by a cap, $a^3$, fitting upon the top of the glass chimney $A^2$, and the products of combustion passing into the annular chimney B through perforations or short pipes $a^5$, reaching across the lower part of chamber C and into the lower end of B. The products of combustion pass out through a chimney, C', which incloses a chamber or pipe, D, leading upwardly from chamber C. A hood or deflector, $D^2$, protects the top of the chimney C' above the car-roof, and the heated air rises through a pipe, E, leading from D to cooling-chamber E' above the car, whence the flues $E^2$ lead back to and have vent only at the burner A', as shown.

The parts B, C, and C' are arranged to slide upward, as shown, to permit the raising or removal of the glass chimney, and they are held down by a spring, as shown, which maintains the cap $a^3$ and its attached parts in close contact with and covering the mouth of the chimney. The successive heating and cooling of the supplied air, and consequent feeding thereof to the burner under a substantially constant and uniform pressure, are accomplished by these described devices in substantially the manner hereinbefore described.

What I claim as my invention, and desire to secure by Letters Patent, is—

1. In a car-lamp, the combination, with the burner and a chimney for the escape of the products of combustion, of a chamber contiguous to said chimney and heated thereby, a cooling-chamber located above said hot chamber and communicating therewith, and a flue leading from said cooling-chamber downwardly to and below and opening at the burner, as and for the purpose specified.

2. In a car-lamp, the combination, with the burner and a chimney, of a chamber surrounding a section of said chimney and heated thereby, a chamber surrounding said first chamber and the remaining portion of the chimney and heated thereby, a cooling-chamber located above said hot chambers and communicating with the latter-named thereof, and a flue leading from said cooling-chamber downwardly to and below and opening at the burner, as and for the purpose specified.

3. In a car-lamp, the combination, with the burner and a transparent chimney, of a metal chimney composed of two sections, the upper of which is fixed and the lower of which fits upon the transparent chimney and is capable of movement longitudinally within or upon the fixed section to and from the transparent chimney, and a chamber contiguous to and heated by said movable section, together with a cooling-chamber located above said hot chamber and communicating therewith, and a flue leading from said cooling-chamber to and below and opening at the burner, as and for the purpose specified.

4. In a car-lamp, the combination, with a burner, a chimney, a ventilator communicating with said chimney, a wind-guard on said chimney in said ventilator, a chamber surrounding said chimney and intermediate the burner and ventilator, a cooling-chamber above said first chamber and communicating therewith, and a flue leading from said cooling-chamber to and below and opening at the burner, as and for the purpose set forth.

5. In a car-lamp, the combination of a fixed support, to which is detachably connected an oil-reservoir, common to two or more lamps carried thereby, a burner and transparent chimney on each lamp, a metal chimney detachably fitted upon the transparent chimney, a rigidly-suspended cylinder inclosing said metal chimney and connected thereto, a ventilator communicating with said metal chimney, a chamber within said cylinder and surrounding said metal chimney and heated thereby, a cooling chamber above said cylinder and communicating thereby with the hot-chamber, a flue leading from said cooling-chamber downwardly of the fixed support, a chamber on the lamp below the burner and opening thereat, and a pipe communicating from said flue to said lamp-chamber, as and for the purpose set forth.

6. In a car-lamp, the combination, with the burner and transparent chimney carried by a bracket detachably suspended by a fixed support, of a metal chimney detachably fitted upon the transparent chimney, a metal cylinder rigidly suspended and supporting the said metal chimney, a chamber surrounding said metal chimney and heated thereby, a cooling-chamber communicating with said hot-chamber, a flue leading from said cooling-chamber to and opening at the burner, and a shade or reflector carried detachably by the supporting-cylinder, as and for the purpose specified.

7. In a car-lamp, the combination, with the burner and the glass chimney, of a metal chimney composed of the sections B and C', the section B being fitted to slide within the section C' and having the flaring flange $b$, the surrounding chamber C, perforated at $b^4$ and $c^2$, the slide-rods $b^2$, and spring $c'$, the inclosing-cylinder D, and diaphragm $d'$, together with pipe E, chamber E', and flue $E^2$, leading from said chamber to the burner, as described, and for the purpose specified.

8. In a car-lamp, the combination of the burner, a transparent chimney, a detachable metal chimney, as described, a chamber, C, a cylinder, D, a chamber, E', a flue, $E^2$, in the lamp-support, and a chamber on the lamp-body opening at the burner and communicating with said flue, as and for the purpose specified.

9. In a car-lamp, the combination, with the car-roof, of the rigidly-suspended cylinder D, a metal chimney supported thereby, a chamber, C, around said chimney, the lamp-burner and transparent chimney, a chamber, E', above said roof, a pipe, E, connecting the chambers, and a flue leading from said cooling-chamber through the roof and to and opening at the burner, as and for the purpose specified.

10. In a car-lamp, the combination, with the bracket-lamp A, its reservoir $a^2$, sectional chimney $A^2$ B, cylinder D, and chambers C and E', and pipe E, of support M, containing flue $E^2$, mouth $e^2$, pipe $e$, and chamber $E^3$, communicating with the burner, as and for the purpose set forth.

WILLIAM WESTLAKE.

Witnesses:
 ARDEN S. FITCH,
 A. G. N. VERMILYA.